United States Patent [19]

Teramachi

[11] 4,253,709
[45] Mar. 3, 1981

[54] FOUR-WAY LOADED TYPE LINEAR BEARING

[76] Inventor: Hiroshi Teramachi, 2-34-8, Higashi-Tamagawa, Setagaya-ku, Tokyo, Japan, 158

[21] Appl. No.: 91,117

[22] Filed: Nov. 5, 1979

[30] Foreign Application Priority Data

Nov. 25, 1978 [JP] Japan ............................. 53/144949

[51] Int. Cl.³ ............................................. F16C 29/06
[52] U.S. Cl. ..................................... 308/6 C; 308/3 A
[58] Field of Search .............. 308/6 C, 3 A, 3.8, 6 B, 308/188, 189 R, 203, 6 R

[56] References Cited

U.S. PATENT DOCUMENTS

| | | | |
|---|---|---|---|
| 3,552,806 | 1/1971 | Weasler et al. | 308/6 C |
| 4,040,679 | 8/1977 | Teramachi | 308/6 C |
| 4,165,195 | 8/1979 | Teramachi | 308/6 C |
| 4,181,374 | 1/1980 | Ernst et al. | 308/6 C |

*Primary Examiner*—Lenard A. Footland
*Attorney, Agent, or Firm*—George B. Oujevolk

[57] ABSTRACT

Disclosed here is a four-way loaded type linear bearing. In a four-way loaded type linear bearing comprising a bearing body, side covers fitted and secured to both end faces of said bearing body, and a retainer inserted and fixed into said bearing body for holding a multitude of balls positioned through said bearing body and said side covers, and bearing body had a square hole therein on the four corners of which are formed axially extending recessed rolling surfaces having almost the same radius of curvature as the ball radius, said bearing body is further provided at both end faces thereof with annular convexes adjacent the edge portions of said rolling surfaces, and holes for escape balls are formed axially adjacent the outer periphery of each said annular convex, while said side covers are each provided with an annular concave to match the annular convex formed on the bearing body, across which annular concave are formed U-shaped grooves for changing the direction of balls, and said retainer has inclined surfaces opposed to the rolling surfaces of the bearing body in which inclined surfaces are formed slits, with tongue pieces formed at both ends of each said slit, furthermore, opening ends corresponding to the width of a rail bed are formed in the lower portion of said bearing body and that of said side covers.

4 Claims, 8 Drawing Figures

FOUR-WAY LOADED TYPE LINEAR BEARING

BACKGROUND OF THE INVENTION

1. Field of the Invention

This invention relates to the improvement of a linear bearing to be used for the sliding surface of the table saddle and machining center in a machine tool, or for the portion of a conveyor apparatus where heavy objects are to be borne and reciprocated.

2. Background of the Invention

A ball bush is widely known as a linear bearing. Against a rising load, however, the ball bush can bear only a small load though it can withstand a radial load. A linear bearing having a larger contact surface between balls and rail is disclosed in U.S. Pat. No. 4,040,679 which is of the same inventor as the present inventor.

In the bearing body disclosed in the said patent there are formed, in its inner peripheral surface, rolling surfaces for guide of balls, namely a plurality of recesses for loaded and unloaded balls, and also peripheral grooves adjacent both ends thereof, while formed in the retainer are a plurality of annular grooves in correlation with the recesses and peripheral grooves formed in the bearing body. However, such bearing body and retainer are so complex in shape that they require an increased number of manufacturing steps, which leads to an increase in cost.

As a result of extensive studies for attaining the mass production and reduction of cost of a linear bearing, I have found that the number of manufacturing steps can be decreased and manufacturing time shortened by dividing a linear bearing into three portions, namely a bearing body and two side covers which are secured to both ends of the bearing body, and further by forming slits in the recess of a retainer which guides and supports loaded balls, with tongue pieces formed at both ends of each said slit.

SUMMARY OF THE INVENTION

It is an object of this invention to provide a four-way loaded type linear bearing suitable for mass production in which a linear bearing is divided into a bearing body, side vovers and a retainer, in the bearing body being formed rolling surfaces or ball trains in opposed manner—right, left and up, down—whereby the rising load, the load toward the upper surface as well as right and left loads can be made almost equal.

It is another object of this invention to provide a four-way loaded type linear bearing in which U-shaped grooves for circulation and changing direction of balls are formed in side covers which are fitted and secured to both end faces of a bearing body.

It is a further object of this invention to provide a four-way loaded type linear bearing suitable for mass production and contributing greatly to the cost reduction in which tongue pieces are formed at both ends of slits or cuts in a retainer which guides rotating and sliding balls, thereby permitting balls to be changed in direction smoothly from linear to turning direction, and these components can be pressed out from a single or two steel plates.

It is still a further object of this invention to provide a four-way loaded type linear bearing in which, for preventing foreign matters from entering into the radial direction of a bearing body, a sealing lip is attached to one end face of a steel plate which also serves as a retainer support and the sealing lip is brought into contact with each side wall of a rail bed and further, for preventing foreign matters from entering in the axial direction of the bearing body, an end plate with seal is attached to each side wall.

DETAILED DESCRIPTION OF THE INVENTION

Figure 1:
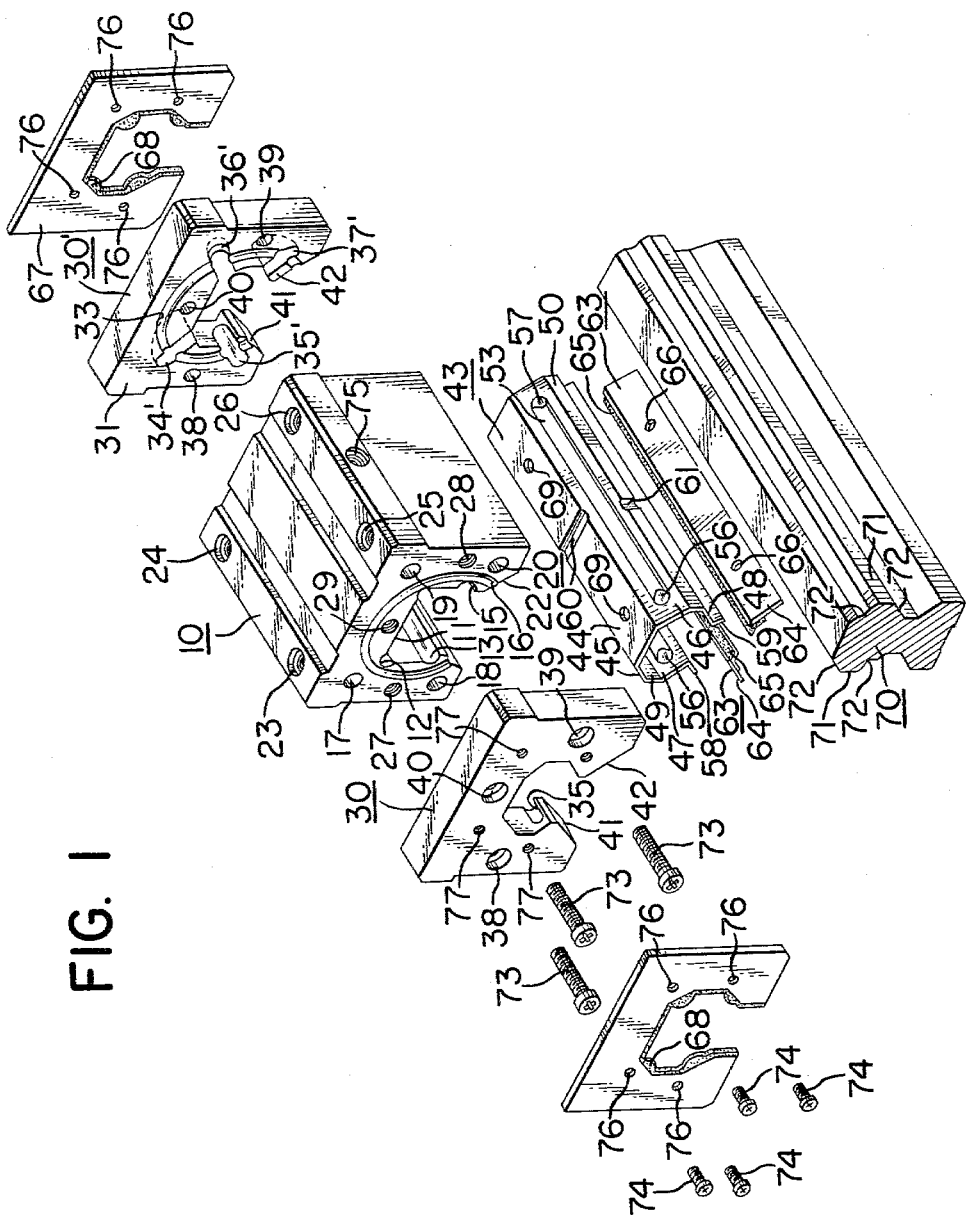
FIG. 1 is an exploded perspective view of a four-way loaded type linear bearing according to this invention illustrated in combination with a rail bed.
Figure 2:
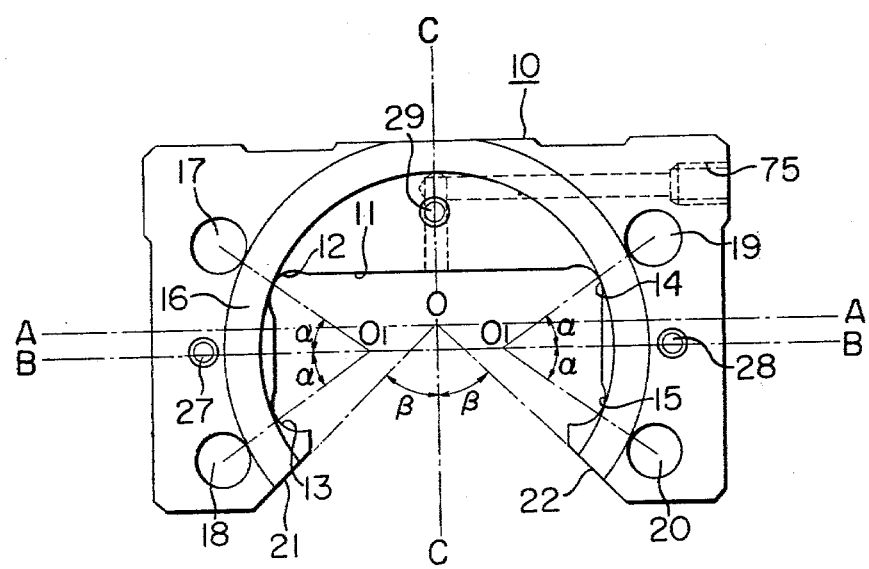
FIG. 2 is an enlarged front view of a bearing body of the four-way loaded type linear bearing of the invention.
Figure 3:
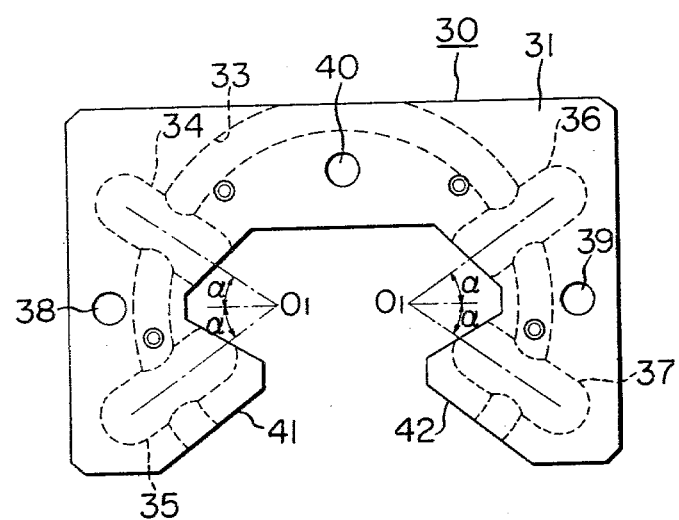
FIGS. 3 and 4 are enlarged front views of side covers in the four-way loaded type linear bearing of the invention.
Figure 4:
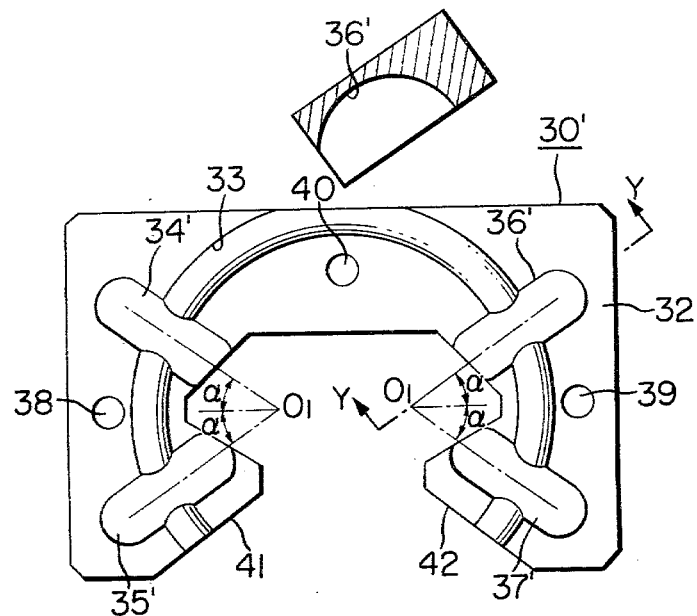
Figure 5:
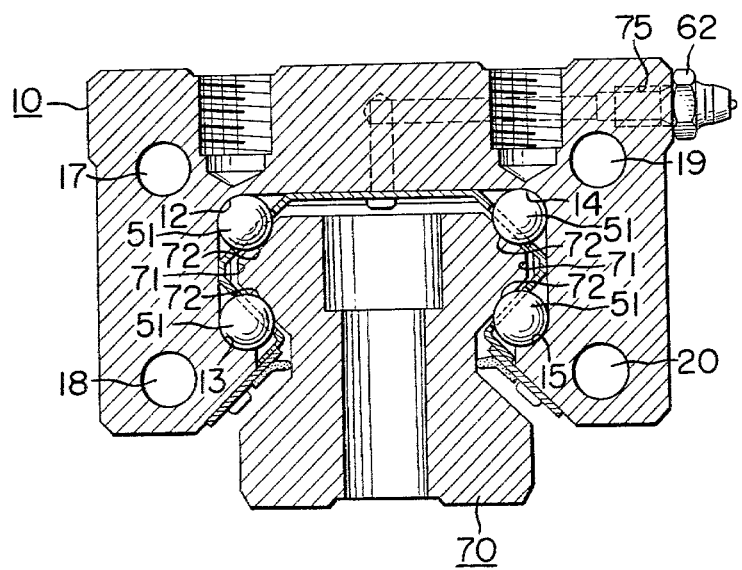
FIG. 5 is an enlarged front view in longitudinal section of the four-way loaded type linear bearing of the invention combined with the rail bed.
Figure 6:
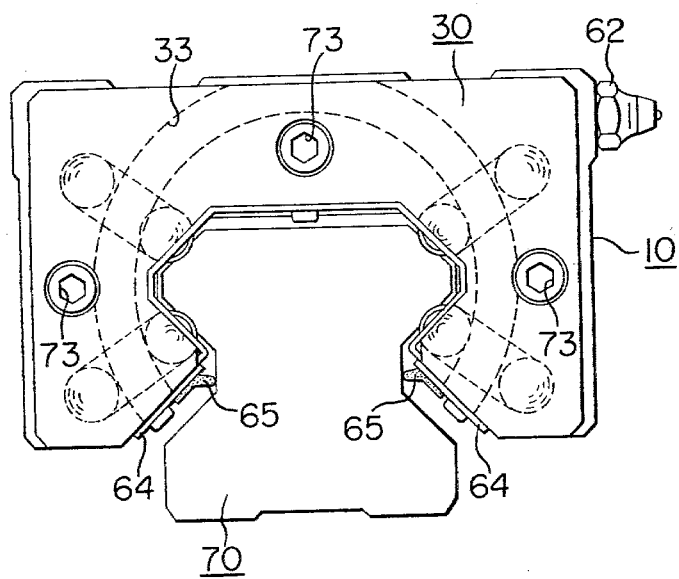
FIG. 6 is an enlarged front view of the four-way loaded type linear bearing of the invention with an axial sealing plate removed therefrom.
Figure 7:
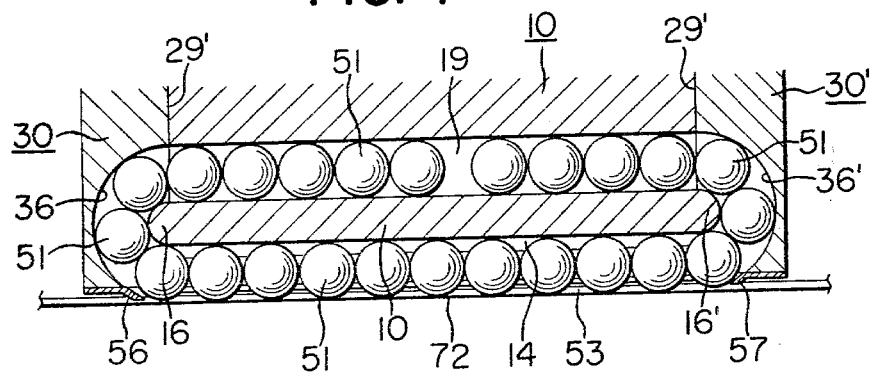
FIG. 7 is an enlarged sectional view taken on line X—X in FIG. 6.

A preferred embodiment of this invention is described below with reference to the accompanying drawings.

It is a bearing body that is indicated generally with the reference numeral 10. The bearing body 10 comprises a block 11 of nearly square section made by cold-drawing a highly abrasion- and corrosion-resisting metallic material, e.g. steel, the block 11 having a square hole in the four corners of which are formed in the axial direction recessed rolling surfaces 12, 13, 14 and 15 having about the same radius of curvature as the ball radius.

Then, the block 11 is cut into a predetermined axial length by lathing work, and annular convexes 16 and 16' are formed on both end faces of the so-cut block 11. Furthermore, four escape ball holes 17, 18, 19 and 20 are formed axially from the sides of the block 11 and in positions abutting the outer periphery of the annular convexes 16, 16' so that the angle, $\alpha$, of the intersecting point, $O_1$, of lines extending through the centers of the said holes and those of the ball rolling surfaces 12, 13 and 14, 15 respectively with respect to line B—B which is parallel to the horizontal line A—A passing through the center, O, of the bearing body 10, is about 35 to 45 degrees.

Thereafter, the portion of the bearing body 10 between the lower, ball rolling surfaces 13 and 15 is cut off so that the angle, $\beta$, of the cut surface with respect to a vertical line C—C which is perpendicular to the aforesaid horizontal line A—A, is within the range of 70° to 90°, whereby opening ends 21 and 22 are formed in the axial direction.

In the upper surface of the bearing body 10 are formed mounting holes 23, 24, 25 and 26, while in both sides (front and rear end faces) are formed side cover mounting holes 27, 28 and 29. The reference numeral 75 is an internal thread for mounting a grease nipple 62.

The numerals 30 and 30' are side covers to be attached to front and rear faces 29', 29' of the bearing body 10, which are formed from a die casting alloy or a synthetic resin material by means of die casting or injection molding. The so-formed side covers have inside surfaces 31 and 32, respectively, in which are formed annular concaves 33 in positions opposed to the annular convexes 16, 16' of the bearing body 10 so that the depth of the concaves 33 is about the same as the height of the convexes 16, 16'.

Ball direction changing U-shaped grooves 34, 35, 36, 37 and 34', 35', 36', 37' which traverse the annular concaves 33 are formed at the same angle as the previously-defined angle, α, in the bearing body 10.

The portion of each of the side covers 30 and 30' positioned between the lower, ball direction changing U-shaped grooves 35 and 37 is cut so that the angle, β, of the cut surface with respect to a vertical line perpendicular to the horizontal line which passes through the center is within the range of 70° to 90°, whereby opening ends 41 and 42 are formed.

In the side covers 30 and 30', moreover, are formed through holes 38, 39 and 40 which coincide with the side cover mounting holes 27, 28 and 29 in the bearing body 10, respectively.

The reference numeral 43 is a retainer formed in generally a polygonal cylindrical body by bending a steel plate inwards, in predetermined positions of which are punched slits as will be described more in detail hereinafter.

The said cylindrical body has an upper surface 44 formed in parallel with the flat surface of the bearing body 10, upper left and right inclined surfaces 45, 46 and lower left and right inclined surfaces 47, 48, with central left and right vertical surfaces 49, 50 placed therebetween. In the upper and lower left and right inclined surfaces 45, 46, 47, 48 are longitudinally formed slits 52, 53, 54, 55, respectively, of a smaller diameter than balls 51, 51, . . . , and curved tongues 56 and 57 are formed at both ends of these slits whereby the balls 51, 51, . . . are changed in direction from linear to turning direction.

The strength and rigidity of such tongues are therefore so essential that rigidity is imparted to the retainer 43 by subjecting the latter to a heat treatment such as tufftriding or carburizing. Thus the entire retainer has a rigidity, so even if the side covers 30 and 30' are formed of a less regid material by die casting or injection molding (for plastics), the resulting bearing according to this invention can be used in any machines.

Figure 8:
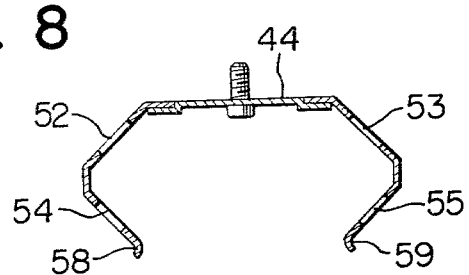
FIG. 8 is a sectional view showing another embodiment of a retainer according to the invention.

And the retainer 43 is formed in such a manner that when it is inserted in the bearing body 10, the centers of the slits 52, 53, 54, 55, of the ball rolling surfaces 12, 13, 14, 15 and of the escape ball holes 17, 18 19, 20 are aligned. The retainer 43 is not always required to be formed from a single steel plate; for example, it may be formed integrally from three divided parts, namely left, right and central parts by fitting the upper ends of the left and right parts over stepped portions of the central connecting part which corresponds to the foregoing upper surface 44 (see FIG. 8).

The reference numerals 58 and 59 are retaining pieces which are formed by bending ends of the left and right parts outwardly at right angles with respect to the lower, left and right inclined surfaces 47, 48.

The numerals 60 and 61 are oil grooves, the former being formed nearly centrally in the upper surface 44 of the retainer 43 and the latter formed in left and right vertical surfaces of the retainer 43. Lubricating oil from a grease nipple 62 is conducted through the bearing body 10 and the oil grooves 60, 61 in the retainer 43 into the slits 52, 53, 54, 55, and thus it is fed to ball sliding surfaces 72, 72, . . . between the balls 51, 51, . . . and a rail bed 70. The retainer 43 is fixed to the inner wall of the bearing body 10 through the medium of mounting holes 69, 69.

The numeral 63 is a retainer support with seal consisting of an elongated steel plate 64 in which are formed mounting holes 66, 66, and a seal 65 having L-shaped section burned and sticked to the outer surface of the steel plate 64. The retainer support with seal 63 is mounted with machine screws between the opening ends 21 and 22 of the bearing body 10 whereby not only the retainer is held in place but also the entry of foreign matters can be prevented by the presence of the seal.

The numeral 67 is an axial sealing plate formed of a punched steel plate to be attached to one end face of each of the side covers 30, 30' and having an opening along which is burned and sticked a rubber seal 68 to the sealing plate.

The numeral 70 is a rail bed provided with two axially extending convex portions 71, 71 and further with round recesses 72, 72 formed on both sides of each said convex portion 71.

The numeral 73 is a bolt for fixing the side covers 30, 30' to the bearing body 10, and the numeral 74 is a machine screw for fixing the sealing plate 67, 67 through holes 76, 76, . . . to internal threads 77, 77, . . . formed in the side covers 30, 30'.

The four-way loaded type linear bearing of this invention constructed as above is assembled in the following manner.

First, the retainer 43 is inserted in the bearing body 10 and fixed to the inner wall thereof with machine screws through the mounting holes 69, 69, and to the opening ends 21, 22 of the bearing body 10 are fixed the retainer support with seal 63, 63 through the mounting holes 66, 66.

Then, to one end of the bearing body 10 is fixed the side cover 30 with bolts, 73, 73, . . . and to the side cover 30 is fixed the sealing plate 67 with machine screws 74, 74, . . .

Thereafter, a predetermined number of balls 51, 51, . . . are inserted successively from the escape ball holes 17, 18, 19 and 20.

Furthermore, the other side cover 30' and sealing plate 67 are mounted in the same manner as above, and now the assembly is over.

Inside the four-way loaded type bearing unit assembled as above is inserted the rail bed 70 having two axially extending convex portions 71, 71 and round grooves 72, 72 formed on both sides of each of the said convex portions so that its contact angle is nearly 35 to 45 degrees.

The apparatus being considered operates in the following manner.

For example, consider the case where the four-way loaded type linear bearing unit of this invention is fitted over the rail bed 70 of a machining center (not shown) and then required implements are set. When the bearing unit advances together with the required implements, the balls 51, 51, . . . held between the round grooves 72, 72, . . . of the rail bed 70 and the ball rolling surfaces 12, 13, 14, 15 of the bearing body 10 roll while being guided by the slits 52, 53, 54 and 55 in the retainer 43, then are changed in direction from linear to turning direction in a dipped-up fashion by the tongues 56 and 57 of the retainer slits 52-55, and the balls roll within the direction changing U-shaped grooves 34, 35, 36, 37 in the side cover 30 until they are conducted smoothly into the escape ball holes 17, 18, 19, 20 in the bearing body 10. Thus the balls 51, 51, . . . are circulated in a smooth manner.

The bearing body 10 and the rail bed 70 are supported at a contact angle of 45 degree with respect to the horizontal axis through the medium of balls in the four grooves, so that there is obtained an equal load resistance in up, down, right and left. That is, the balls are arranged along the long, axially extending round grooves formed in the rail bed with the grooves being of about the same radius of curvature as that of the balls, while the ball rooling surfaces formed in the bearing body are also of about the same radius of curvature as that of the balls, and the rail bed is inserted in the bearing body so that the balls are held in the said four grooves. By so doing, the balls are pre-loaded, giving a bearing having a high rigidity and capable of withstanding a high load.

The four ball rolling surfaces in the bearing body, the opening portion and the outer peripheral shape can be formed in a mass-produced manner by cold drawing, resulting in that the number of manufacturing steps and the cost can be decreased.

Since the retainer is of a simple shape, it can be pressed out of a steel plate. Furthermore, the retainer having sufficient strength and rigidity is provided with tongue pieces which act to dip up balls, whereby the balls are changed in direction from linear to turning direction, and this permits the side covers to be formed from a die casting or synthetic resin whose rigidity is lower than that of steel; as a result, the cost can be cut down.

In addition, a retainer support with seal is provided in the axial direction and a rubber seal provided in the radial direction, so that the dust prevention and lubrication are easy.

What is claimed is:

1. A four-way loaded type linear bearing comprising:
a bearing body, said bearing body having a square hole therein on the four corners of which are formed axially extending recessed rolling surfaces having almost the same radius of curvature as the ball radius, said bearing body also having at each of the end faces thereof an annular convex portion adjacent the edge portions of said rolling surfaces and further having escape ball holes which axially extends through said bearing body in positions adjacent the outer periphery of said annular convex portion;
side covers to be fitted and secured to the end faces of said bearing body, said side covers being each provided with an annular concave portion formed to match said annular convex portion in said bearing body, and further provided with ball direction changing U-shaped grooves which extend across said convex portion; and
a retainer to be inserted and fixed into said bearing body, said retainer having inclined surfaces in positions opposed to said plural rolling surfaces in which inclined surfaces are formed slits, and further having tongue pieces formed at both ends of said slits,
in which opening ends corresponding to the width of a rail bed are formed in the lower portion of said bearing body and that of said side covers.

2. The four-way loaded type linear bearing as defined in claim 1, in which a retainer support with seal is attached to each of said opening ends of said bearing body, and an end plate with seal is attached to each of said side covers.

3. The four-way loaded type linear bearing as defined in claim 1, in which said side covers are formed of a die casting or a synthetic resin.

4. The four-way loaded type linear bearing as defined in claim 1, in which said retainer is composed of a central connecting plate and right and left members.

* * * * *

UNITED STATES PATENT AND TRADEMARK OFFICE
CERTIFICATE OF CORRECTION

PATENT NO. : 4,253,709

DATED : March 3, 1981

INVENTOR(S) : Hiroshi TERAMACHI

It is certified that error appears in the above-identified patent and that said Letters Patent is hereby corrected as shown below:

At column 6, line 20, delete "convex" and substitute therefor --concave--.

Signed and Sealed this

Twenty-fourth Day of December, 1991

Attest:

HARRY F. MANBECK, JR.

*Attesting Officer*  *Commissioner of Patents and Trademarks*